March 26, 1968     R. L. GOWER     3,374,620

S-SHAPED CONNECTOR DEVICE

Filed June 5, 1967

INVENTOR.
ROGER L. GOWER

BY

ATTORNEY.

United States Patent Office 3,374,620
Patented Mar. 26, 1968

3,374,620
S-SHAPED CONNECTOR DEVICE
Roger L. Gower, P.O. Box 65,
Canaan, Maine 04924
Filed June 5, 1967, Ser. No. 643,445
2 Claims. (Cl. 59—93)

ABSTRACT OF THE DISCLOSURE

The present invention relates to weldless connector means for chain and cable assemblies.

It is the purpose of this invention to provide a connector device using the connector head of my patent application being filed concurrently herewith, titled, "Head for Weldless Connectors," and having a pair of said heads oppositely disposed at the ends of an S-shaped shank, for making a connection as between the ends of two lengths of chain, rapidly and with limited possibility that the connector will become accidentally disengaged.

In the drawings forming a part of this application, in which similar numerals designate like parts throughout, FIGURE 1 is a plan view of an S-shaped connector;

FIGURE 3 shows the S-hook of the present invention connecting the ends of two pieces of chain, with the S-hook in side elevation; while

Figure 1:

Referring more particularly to the drawings,

FIGURE 1 shows an S-shaped shank 10 formed with heads 11, 11 which terminate in plate-shaped end portions 12, 12

Figure 2:
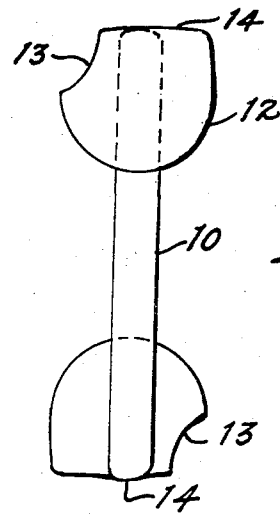
FIGURE 2 is a side view of the S-shaped connector of FIGURE 1.

FIGURE 2 shows a face view of one of said plates 12, having a cut-out arc 13 adjacent to secant 14, in accordance with the teachings of my said co-pending application being filed concurrently herewith; and at the other end of the device the shank 10 is shown terminating in an oppositely disposed head 11 and plate 12 having like cut-out arc 13 and secant 14.

Figure 3:
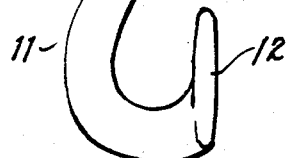
Figure 4:
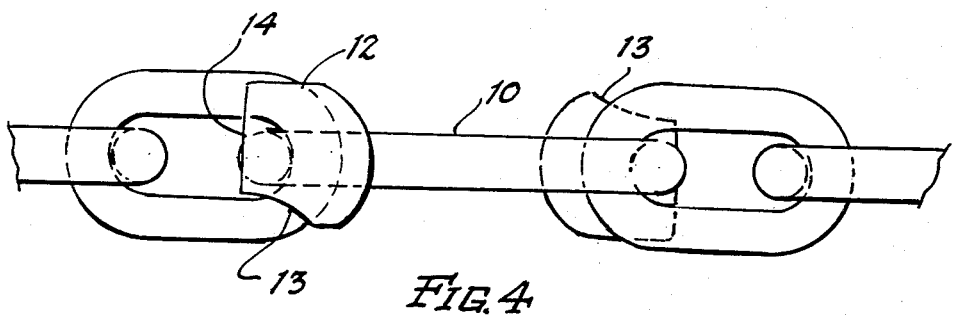
FIGURE 4 shows the S-hook of the present invention connecting the ends of two pieces of chain, wherein the face of one end of said hook is shown interlinked with the chain and at the opposite end the shank is seen as the hook is interlinked with the other chain.

The S-shaped shank is so disposed with respect to the heads 11, 11 as to provide a balanced tension when the connector device is attached to the ends of two pieces of chain, as has been shown in FIGURES 3 and 4.

While the form of the invention as shown and described herein may be taken as a preferred example of the same, it is to be understood that modification may be made without departing from the spirit of the invention, within the attached claims.

What I claim as my invention and desire to secure by Letters Patent of the United States, is:

1. A connector device having an S-shaped shank terminating at each end in oppositely disposed hooks each comprising a head and a plate integral with said shank, said plate having means for insertion thereof through a link as of chain, to provide for contiguity between said plate and head and the bearing of said link, said means including chord and concave arc segments on the periphery of said plate.

2. An invention as claimed in claim 1, wherein the plates of said oppositely disposed hooks lie in a plane perpendicular to the plane of said S-shaped shank, to provide parallelism between said plates and the planes of the links through which they are inserted.

References Cited

UNITED STATES PATENTS

| | | | |
|---|---|---|---|
| 1,060,744 | 5/1913 | Covert | 59—85 |
| 1,583,029 | 5/1926 | Thomas. | |
| 2,740,253 | 4/1956 | Waller | 59—85 |

RICHARD E. AEGERTER, *Primary Examiner.*

R. D. GUIOD, *Assistant Examiner.*